US007862432B2

(12) United States Patent
Lippincott

(10) Patent No.: US 7,862,432 B2
(45) Date of Patent: Jan. 4, 2011

(54) MULTIPLE PLAYER GAME SYSTEM, METHODS AND APPARATUS

(76) Inventor: Louis A. Lippincott, 720 Anderson Dr., Los Altos, CA (US) 94024

( * ) Notice: Subject to any disclaimer, the term of this patent is extended or adjusted under 35 U.S.C. 154(b) by 894 days.

(21) Appl. No.: 11/043,791

(22) Filed: Jan. 25, 2005

(65) Prior Publication Data

US 2005/0202871 A1      Sep. 15, 2005

Related U.S. Application Data

(60) Provisional application No. 60/539,236, filed on Jan. 26, 2004, provisional application No. 60/613,437, filed on Sep. 28, 2004.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............... 463/40; 463/43; 463/25; 463/37; 434/352; 434/323; 273/433

(58) Field of Classification Search ............ 463/36–40; 116/222–225
See application file for complete search history.

(56) References Cited

U.S. PATENT DOCUMENTS

| 5,092,779 | A | * | 3/1992 | Piwonka et al. | ............. 434/352 |
| 5,331,450 | A | * | 7/1994 | Heep et al. | ................... 398/92 |
| 6,141,004 | A | * | 10/2000 | Jeong | ......................... 715/723 |
| 6,301,243 | B1 | * | 10/2001 | Copper et al. | ............... 370/349 |
| 6,389,221 | B1 | * | 5/2002 | Saeki et al. | .................... 386/95 |
| 6,515,992 | B1 | | 2/2003 | Weston et al. | |
| 7,115,032 | B2 | * | 10/2006 | Cantu et al. | .................... 463/9 |
| 2002/0167489 | A1 | * | 11/2002 | Davis | ........................ 345/157 |
| 2003/0003993 | A1 | * | 1/2003 | Leifer et al. | .................. 463/39 |
| 2003/0095525 | A1 | * | 5/2003 | Lavin et al. | ................ 370/338 |
| 2003/0144056 | A1 | * | 7/2003 | Leifer et al. | .................. 463/39 |
| 2004/0054826 | A1 | * | 3/2004 | Kavanagh | .................... 710/62 |
| 2004/0137985 | A1 | * | 7/2004 | Sprudzans et al. | ............ 463/36 |
| 2004/0166939 | A1 | * | 8/2004 | Leifer et al. | .................. 463/39 |
| 2005/0014563 | A1 | * | 1/2005 | Barri | .......................... 463/43 |
| 2005/0070361 | A1 | * | 3/2005 | Lau et al. | ....................... 463/43 |

(Continued)

OTHER PUBLICATIONS

"Jeopardy!® for the Sega CD™." Instruction manual © 1994 from replacementdocs <http://www.replacementdocs.com/request.php?4768>.*

*Primary Examiner*—John M. Hotaling, II
*Assistant Examiner*—Paul A. D'Agostino
(74) *Attorney, Agent, or Firm*—Edwin D. Schindler

(57) ABSTRACT

Methods and systems are described for providing a multi-player game system using standard consumer electronics equipment. For example, a system for playing multi-player games on a DVD player and other standard consumer electronics equipment receives commands from player remote controls in response to prompts from a game being played on the DVD player and other standard consumer electronics equipment. An electronic control mechanism determines which of the player remote controls first responds to the prompt. If necessary, the electronic control mechanism translates commands from the remote controls to commands compatible with and understandable by the DVD player and other standard consumer electronics equipment. A transmitter then sends the commands to the DVD player and other standard consumer electronics equipment. Based on those commands, the game proceeds until completed.

14 Claims, 8 Drawing Sheets

U.S. PATENT DOCUMENTS

| | | | |
|---|---|---|---|
| 2005/0096134 A1* | 5/2005 | Lippincott | 463/40 |
| 2005/0164791 A1* | 7/2005 | Leifer et al. | 463/39 |
| 2005/0202871 A1* | 9/2005 | Lippincott | 463/39 |
| 2005/0215324 A1* | 9/2005 | Lippincott | 463/43 |
| 2006/0111183 A1* | 5/2006 | MacIver | 463/36 |
| 2006/0111185 A1* | 5/2006 | MacIver | 463/36 |
| 2007/0063862 A1* | 3/2007 | Lippincott | 340/825.69 |

* cited by examiner

MULTIPLE PLAYER GAME SYSTEM, METHODS AND APPARATUS

CROSS-REFERENCE TO RELATED APPLICATIONS

This application is related to and claims domestic priority under 35 U.S.C. §119(e) from prior U.S. Provisional Patent Application Ser. No. 60/539,236 filed on Jan. 26, 2004 entitled "Multiple Player DVD Game System, Methods, and Apparatus", by inventor Lou Lippincott and U.S. Provisional Patent Application Ser. No. 60/613,437 filed on Sep. 28, 2004 entitled "Multiple Player Game System, Methods, and Apparatus", by inventor Lou Lippincott, the entire disclosures of which are hereby incorporated by reference as if fully set forth herein.

TECHNICAL FIELD

This invention relates generally to electronic games and optical storage discs and more specifically to a multiple-player game that can be played back on a standard consumer electronics digital versatile disc (DVD) player.

BACKGROUND

A number of single-player games have been developed that can be played in conjunction with standard consumer electronics, such as DVD players, stereo equipment, video recorders, media centers, DVD recorders, and other systems whose primary function is not gaming. For example, some DVD movies include short trivia games, mazes, or other simple games as features on their discs. Moreover, a number of board games have been developed that are supplemented by features displayed on standard consumer electronics equipment. For example, Scenelt? is a board game that comes with a DVD containing scenes from popular movies and television programs. During the game, players watch scenes from the DVD and take turns trying to identify the shows being played. The consumer electronics equipment is used to enhance gaming and entertainment environments.

One of the major drawbacks to current game systems using standard consumer electronics is that they do not allow multiple players to concurrently interact with them in any substantive way within the context of a multi-player game. For example, in the game Scenelt? the DVD player only shows program clips. The DVD portion of the game provides no other meaningful action in the game. This is in spite of the popularity and low cost of the standard consumer electronics DVD player and its typical location in the home.

The large installed base of standard consumer electronics DVD players should make the DVD player device an attractive choice for game developers. But, currently, the inability to have truly interactive multiple-player games is seen as a hindrance to the large scale acceptance of the standard consumer electronics DVD player as a central game machine in the home.

Thus, there is a need in the art for methods, systems, and apparatuses that provide an environment in which multiple players can play a game using a standard consumer electronic device.

SUMMARY

Methods and systems are presented herein for providing a multi-player game system using standard consumer electronics equipment.

According to a first aspect, a system for playing multi-player games on a digitial versatile disc (DVD) player and other standard consumer electronics equipment receives commands from player remote controls in response to prompts from a game being played on the DVD player and other standard consumer electronics equipment. An electronic control mechanism determines which of the player remote controls first responds to the prompt. If necessary, the electronic control mechanism translates commands from the remote controls to commands compatible with and understandable by the DVD player and other standard consumer electronics equipment. A transmitter then sends the commands to the DVD player and other standard consumer electronics equipment.

According to a second aspect, a method for playing a multi-player game on a DVD player includes receiving input signals from multiple remote controls, then, determining which remote control sent the first input signal to a DVD Multiple Player Device. After determining which remote control was first, the input signals from the first remote control are translated to a form compatible with the DVD player. The DVD Multiple Player Device indicates to players which of the remote control devices was first and forwards any subsequent signals sent from the remote control to the DVD player, including signals that help players navigate menus displayed by the DVD player.

According to a third aspect, a method for identifying which of several remote controls is allowed to respond to prompts from a DVD-based game. The DVD disc itself is encoded with audio and visual game data hidden from view that is associated with each of the several remote controls. Input responses from the remote controls are based on which player rang in first.

Additional features and advantages of the invention will be made apparent from the following detailed description of embodiments that proceeds with reference to the accompanying drawings.

BRIEF DESCRIPTION OF THE DRAWINGS

Embodiments may be best understood by referring to the following description and accompanying drawings. In the drawings.

DETAILED DESCRIPTION

Methods, apparatuses, and systems for a multiple-player game architecture are described. In the following description, numerous specific details are set forth. However, it is understood that embodiments may be practiced without these specific details. In other instances, well-known circuits, structures, and techniques have not been shown in detail in order not to obscure the understanding of this description. While described with reference to playing multiple-player games, specifically, four players on a digital versatile disc (DVD) player, embodiments are not so limited. For example, embodiments include the playing of games with any number of players. For another example, embodiments include the playing of games on a DVD recorder, personal video recorder, media center, etc. Embodiments also include playing and controlling the playback of content other than games, such as training material, audio visual aids, etc.

Figure 1:
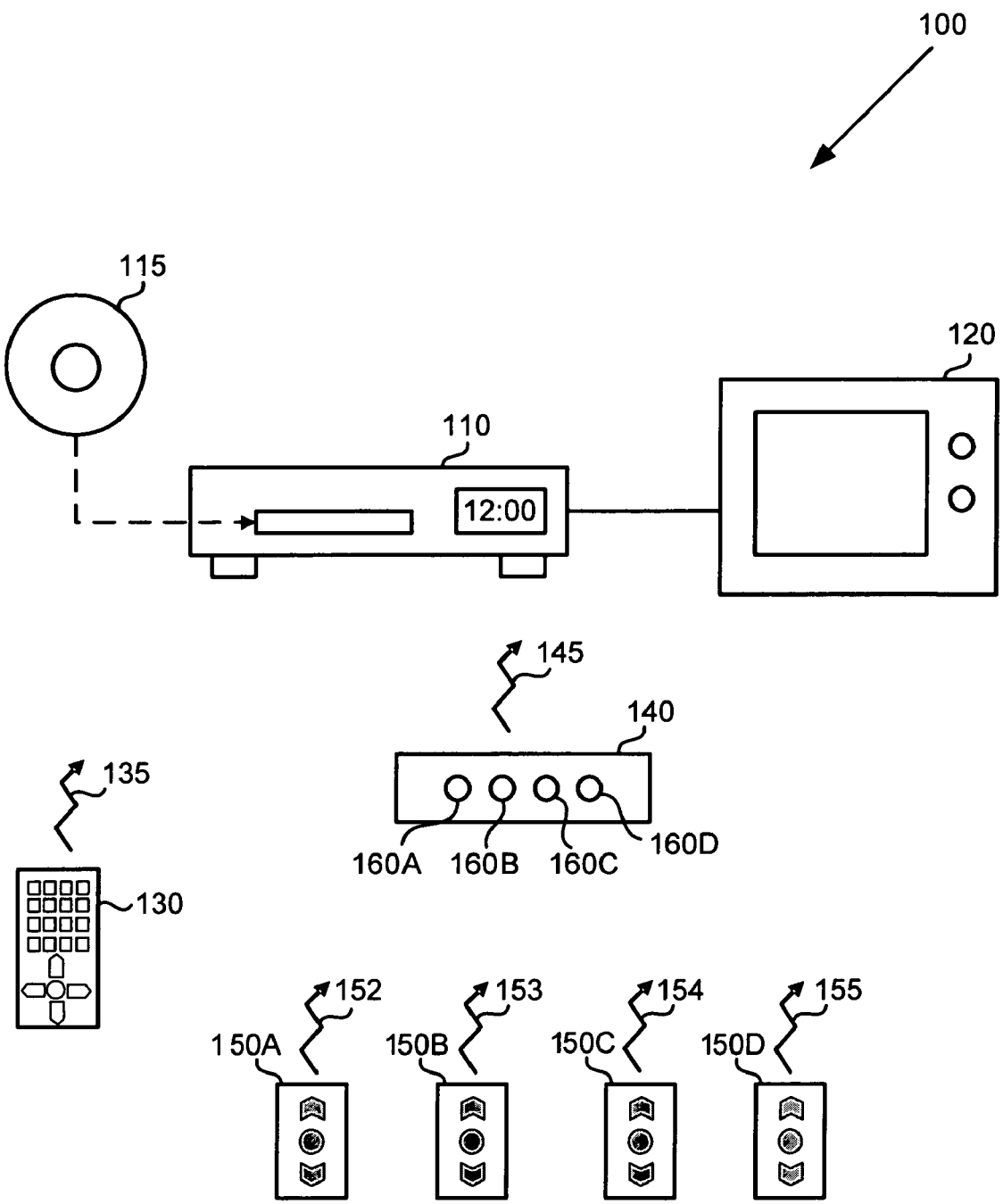
FIG. 1 illustrates a simplified block diagram of a system configuration that includes a DVD Game Disc, DVD player, Television, DVD Remote Control, DVD Multiple Player Device, and four Player Remote Controls, according to embodiments.

FIG. 1 illustrates a simplified block diagram of a system configuration 100 for playing multi-player games on standard consumer electronics systems. As shown, FIG. 1 illustrates a system 100 that includes a DVD Game Disc 115, DVD Player 110, Television 120, DVD Remote Control 130, DVD Multiple Player Device 140, and four Player Remote Controls 150A, 150B, 150C, and 150D. The DVD Player 110, Television 120, and DVD Remote Control 130 are standard consumer electronics devices. For example, the Television 120 includes any of a number of different viewing devices, such as high-definition television, plasma screen television, other types of television sets, computer monitors, etc. Similarly, the DVD Player 110 includes a DVD player, a DVD recorder, a media Center, a personal video recorder, etc.

The DVD Game Disc 115 containing game content is inserted into the DVD Player 110, which is coupled to the Television 120. The DVD Remote Control 130 transmits signals 135 to the DVD Player 110 and, in some embodiments, the DVD Multiple Player Device 140. The four Player Remote Controls 150A, 150B, 150C, and 150D transmit signals 152, 153, 154, 155 to the DVD Multiple Player Device 140. In some embodiments, the signals 135, 145, 152, 153, 154, 155 are Infra Red (IR) signals. Alternatively, they may be a different signal, e.g., radio frequency, microwave, or other wireless signal. In some embodiments, the Player Remote Controls 150A-D are coupled to the DVD Multiple Player Device 140 through a cable. In some embodiments, the four Player Remote Controls 150A-D are colored Red, Green, Blue and Yellow, in order to make them easily identifiable to the players. Other techniques may be used to distinguish Player Remote Controls from one another, e.g., numbering them, labeling them, etc.

The transmitted signals 135, 145 send commands to the DVD Player 110. The DVD Player receives those commands. The DVD Multiple Player Device 140 receives commands from the four Player Remote Controls 150A-D and, in some embodiments, the DVD Remote Control 130.

The DVD Multiple Player Device 140 has LED displays 160A-D to indicate states and conditions of the game to the players. Notably, the number of LED displays on the DVD Multiple Player Device may be more or less than four based on finctional design, aesthetic design, the number of players the device is designed for, size of the device, cost, etc.

In some embodiments, game modes are configured before the game play starts by sending commands to the DVD Multiple Player Device 140 from the DVD Remote Control 130 or Player Remote Controls 150A-D. The game modes define the game pace, patterns of game challenges, game conclusion criteria, game scoring criteria, the maximum game challenges on the DVD Game Disc 115, and other aspects of the game not described herein.

Figure 2:
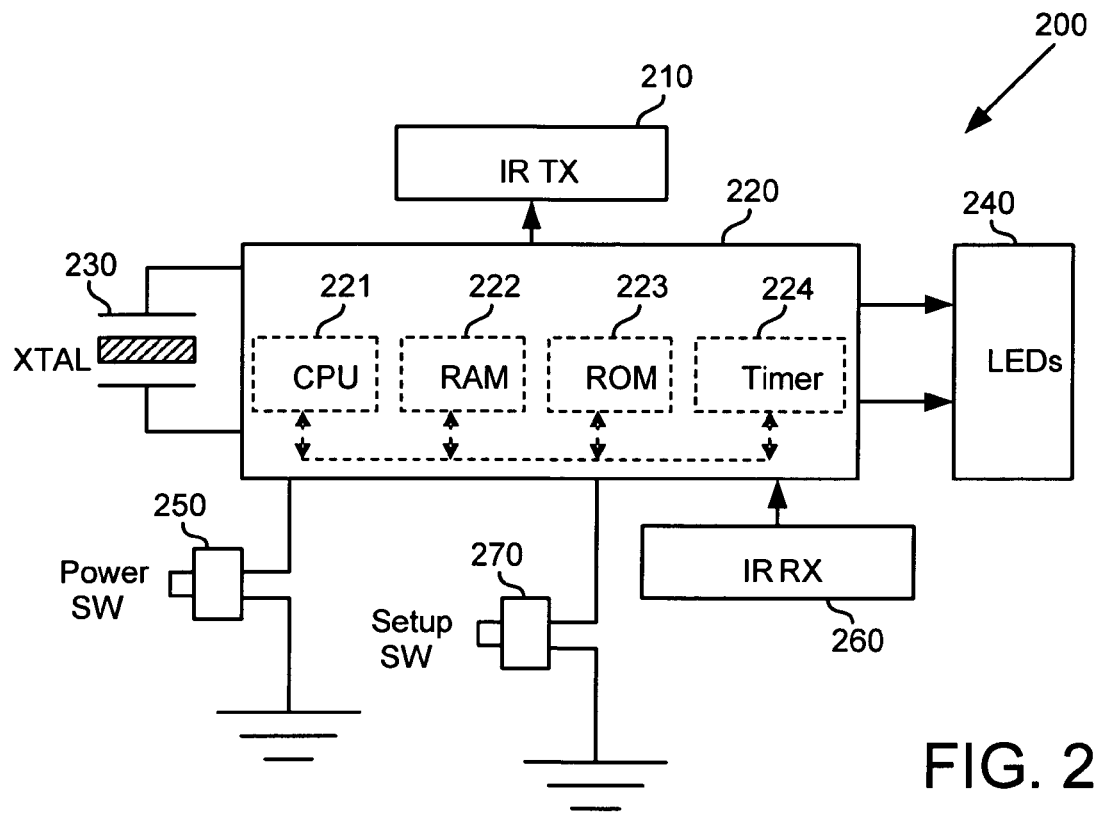
FIG. 2 illustrates a more detailed block diagram of a DVD Multiple Player Device unit, according to embodiments.

FIG. 2 illustrates a simplified block diagram of a DVD Multiple Player Device 200, which receives signals from Player Remote Controls and determines which player has priority inputting a response to displayed data. For example, a DVD Player causes a trivia question to be displayed on a Television; the DVD Multiple Player Device determines which of multiple players "rings" in first. In some implementations, the DVD Multiple Player Device 200 is the DVD Multiple Player Device 140 illustrated in FIG. 1.

As shown, FIG. 2 illustrates an exemplary configuration of a DVD Multiple Player Device 200 that includes an Electronic Control Mechanism 220, comprising a CPU 221 coupled to RAM 222, ROM 223 and at least one Timer 224, an IR Transmitter 210, an IR Receiver 260, Clock timing device 230, Power Switch 250, Setup Switch 270, and LEDs 240. Alternatively, the device may use other components, for example, it may use an RF transmitter, a reset switch, an RF receiver, etc.

The Electronic Control Mechanism 220 processes received signals and commands received from Player Remote Controls. The Clock timing device 230 is used to provide a predictable timing source and clock to the CPU 221. The Clock timing device 230 may be a crystal timing device, a ceramic resonator timing device, a ring oscillator device, or a resistor/capacitor timing device. The Clock timing device 230 may be integrated with the CPU 221 device as a factory trimmed timing source that is accurate enough to time the commands from the IR Transmitter 210. In some embodiments, the Clock timing device 230 runs at a rate of 4 MHz. Alternatively, it may run at a slower or a faster rate, for example, at 1 MHz or 10 MHz. The IR Transmitter 210 is used to send commands to a DVD Player, such as DVD Player 110 illustrated in FIG. 1, otherwise emulate, and send the commands that a DVD Player normally receives from a DVD Remote Control such as the DVD Remote Control 130 illustrated in FIG. 1. The IR Receiver 260 is used by the DVD Multiple Player Device 140 to receive commands from a DVD Remote Control and Player Remote Controls such as Player Remote Controls 150A-D illustrated in FIG. 1.

In some embodiments, the IR Receiver 260 is an integrated component containing an IR detector, amplifier, clipper, bandpass filter, and integrator in one small, inexpensive module. Alternatively, they may be separate or a combination thereof.

The Power Switch 250 is used to power on and initialize the DVD Multiple Player Device 200 to a known state. In some embodiments, the Power Switch 250 may also be used to abort a game in progress. Alternatively, a separate reset switch may perform this function.

In some embodiments, the Setup Switch 270 is used to select the type of IR protocol and specific bit patterns for controlling the DVD Player 110. This process of selecting IR protocol and bit pattern may be done at power up, in connection with the Power Switch 250, or at some other time.

The LEDs 240 are used to give immediate feedback to players from the DVD Multiple Player Device 200. For example, DVD Multiple Player Device 200 signals which player has won the opportunity to answer the Game Challenge. This may be done by blinking an LED a specific number of times per player or blinking an LED that corresponds to the player who first signaled a response. For example, the Red Player is indicated by one flash followed by a pause, the Green Player is indicated by two flashes followed by a pause, the Blue Player is indicated by three flashes followed by a pause, and the Yellow Player is indicated by four flashes followed by a pause. In other embodiments, a colored LED corresponds to each player. For example, a red LED corresponds to the red player, a yellow LED corresponds to the yellow player, etc. Other LED configurations may be used to indicate the player who first signals a response.

In some embodiments, the LEDs 240 or others may be used to indicate the state of the DVD Multiple Player Device 200. For example, a red LED may indicate that the DVD Multiple Player Device 200 is not ready to receive input from all players. An exemplary situation is when a question is being answered. The DVD Multiple Player Device is configured to ignore any invalid input until after a question is completed. At that point a green LED is lit. Alternatively, an LED 240 flashes at a slow rate when the DVD Multiple Player Device 200 is able to accept a response from the Player Remote Controls. The DVD Multiple Player Device 200 includes other LED configurations.

In one embodiment, the DVD Multiple Player Device 200 contains a buzzer (not shown) to give an audible indication that a Player has been selected.

Figure 3:
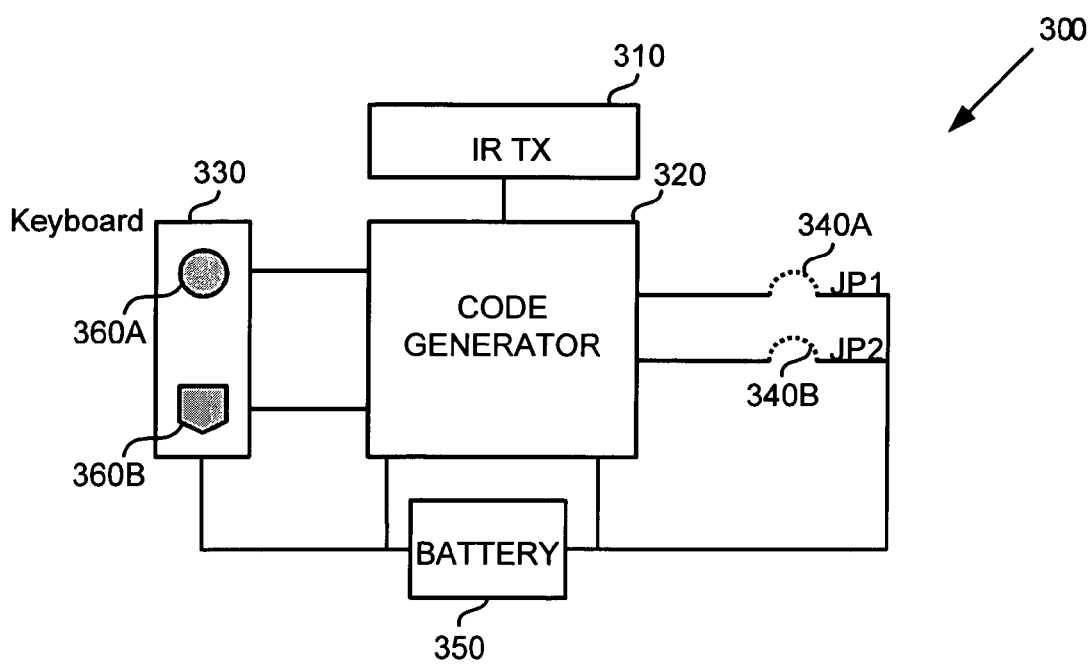
FIG. 3 illustrates a more detailed block diagram of a Player Remote Control, according to embodiments.

FIG. 3 illustrates a simplified block diagram of a Player Remote Control, which allows users to interact with a DVD Multiple Player Device. As shown, FIG. 3 illustrates a Player Remote Control 300 such as Player Remote Controls 150A-D described in connection with FIG. 1. Player Remote Control 300 includes a Code Generator 320, an IR Transmitter 310, a Battery or set of batteries 350, Jumpers 340A and 340B, and a Keyboard 330 with at least a Navigate Down Key 360B and an Enter Key 360A, according to some embodiments. Notably, the Player Remote Control may include more or less keys based on functional design, aesthetic design, etc. For example, it may include a Navigate Up key, a Menu key, and other assorted keys to facilitate use of a DVD Multiple Player Device.

When the player pushes a key on the Keyboard 330, a code is transmitted to a DVD Multiple Player Device such as DVD Multiple Player Device 140 illustrated in connection with FIG. 1. The code transmitted depends on which key was pressed and, in some embodiments, which jumpers are set. In some embodiments, the Jumpers 340A and 340B set the player identification for the Code Generator 320. The codes generated for the different players are unique, so each Player Remote Control 300 is designed to send a unique code.

The unique code indicates to a DVD Multiple Player Device which player is pressing a key and which key is being pressed. This allows a DVD Multiple Player Device to control the play of the game according to responses from the players. For example, a DVD Multiple Player Device can tell which player was the first to hit the Navigate Down key 360B, or alternatively the Enter key 360A, after a Game Challenge is presented to all players by sorting out received codes. A code corresponding to the specific Player Remote Control 300 is sent by the Code Generator 320 as soon as a key is pressed down. To ensure reception of the signal, the sent code is repeated. In some embodiments, the cadence or repeat rate of the code is controlled by the setting of the jumpers. Different Player Remote Controls 300 repeat their codes at different rates, which means there is a different amount of pause time between the first and second IR code transmission for each Player Remote Control 300. This ensures that a DVD Multiple Player Device will be able to decipher the code in those instances when more than one Player Remote Control 300 transmits a code at roughly the same time, causing the codes to overlap and interfere with each other.

In some embodiments to avoid signal conflicts, the codes sent by the Player Remote Control 300 are of a type that are not understood or recognized by standard consumer electronic DVD players.

Figure 4:
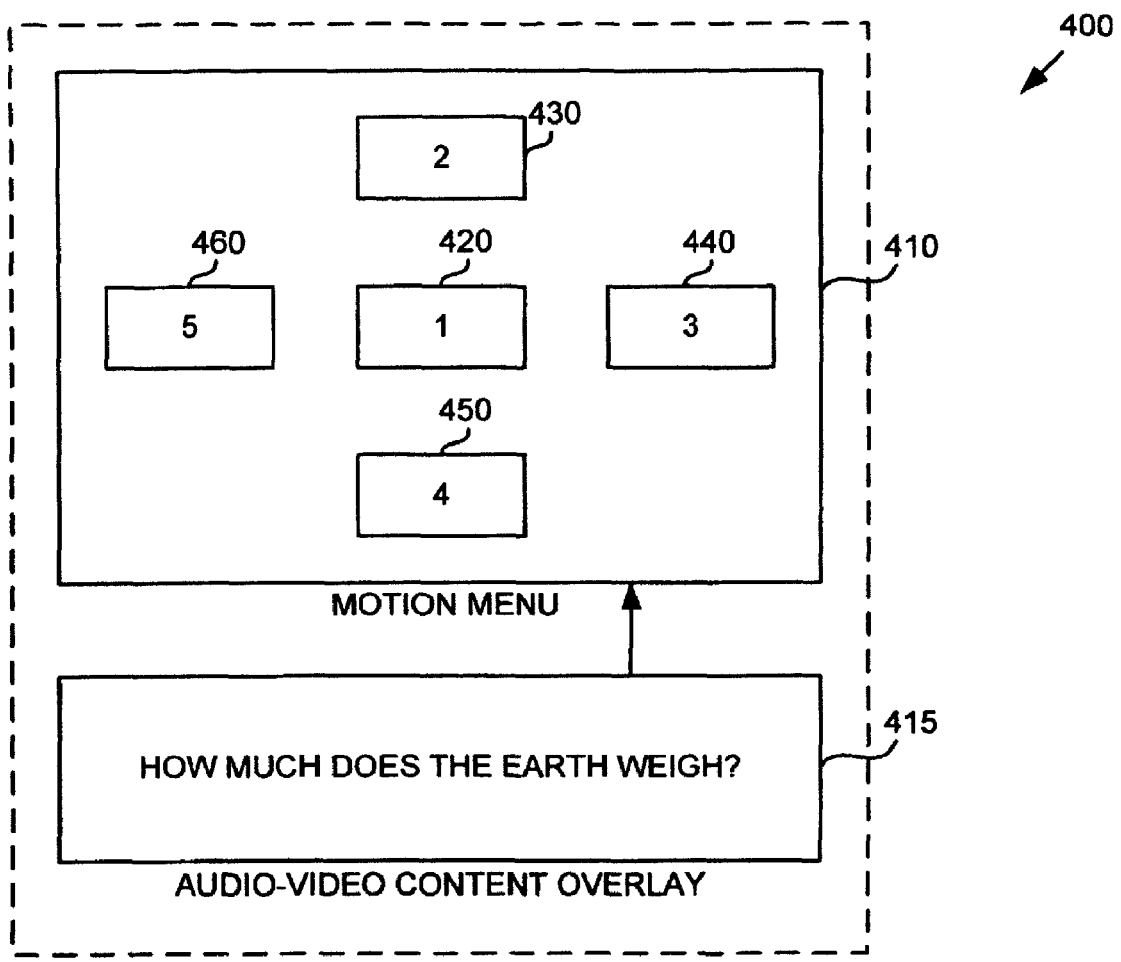
FIG. 4 illustrates a motion menu for a Game Challenge of a multiple-player game example, according to embodiments.

FIG. 4 illustrates a simplified block diagram of a menu Game Challenge configuration that may include several features such as an introduction, rules review, menu buttons, etc. As shown, FIG. 4 illustrates a diagram of a Menu Configuration 400 that includes a Motion Menu 410, Audio-Video Content Overlay 415, and five menu buttons 420, 430, 440, 450, 460. The Motion Menu 410 may have more or less buttons depending on game options, complexity of the game, and other such factors.

The First Play (not shown) is an audio/video sequence that is automatically played by a DVD Player when a DVD Game Disc is first inserted. The First Play generally ends with a transition to a top level menu, also not shown. In some embodiments, the First Play contains the game preparation steps, rules of the game and a description of the game play. The First Play may also contain advertisements for additional DVD Discs that can be played with a DVD Multiple Player Device system. In some embodiments, a game is started by a person making a selection from the top level menu (not shown) as is usually done with DVD movies. The authoring of the First Play sequence and the top level selection menus is well known in the industry and providing further details is beyond the scope of this description.

After the First Play, a DVD Game Disc presents a Game Challenge in the form of an audio/video sequence, a still picture menu or motion menu like the one shown in FIG. 4. A Game Challenge includes the actual steps, theories, interactive content, and events that are associated with playing a game. For example, in a trivia game, the Game Challenge is a question presented to users on a Television.

As mentioned, the Menu Configuration 400 contains the playback of a video and audio sequence, the Audio-Video Content Overlay 415, representing the Game Challenge. Or, it is simply a still menu with text asking a question or presenting some other type of Game Challenge. DVD discs can be authored in a manner that allows a DVD Player to select Game Challenges at random or select Game Challenges according to the play of the game or based on previous responses from the players. Several examples of sophisticated DVD games exist in the market already and the methods of authoring such a disc are well known and beyond the scope of this description. However, in order for the DVD game disc to play in a predictable manner with a DVD Multiple Player Device the DVD Game Disc must be authored with aspects of a DVD Multiple Player Device behavior considered.

One of the menu buttons is the default menu button 420. It is the default selection button each time the Game Challenge menu 400 is entered if no further navigation commands are sent to a DVD Player. The default menu button 420 serves as a reference point for a DVD Multiple Player Device to control the play of the game in a repeatable and predictable manner. In some embodiments, during play of a game and in various other menus, a default button is placed in an optimum button location based on game considerations. For example, suppose on a menu, a button labeled "Next Question" is the most likely button to be selected. In that case the default button would be the "Next Question" button. Designation of default buttons may be determined in a variety of ways, most of which are known and beyond the scope of this invention.

From the Game Challenge menu 400, all buttons on the Motion Menu 410 are invisible to the players. This may be done by setting their opacity values to zero when authoring the Game Disc or by using a different technique. With the opacity values set to zero the players see only the video from the Audio-Video Content Overlay 415, even though the menu buttons in the Motion Menu 410 are actually present.

Buttons 430, 440, 450 and 460 are set to auto-activate during the authoring of the DVD Game Disc in order to automatically execute their function when selected, according to embodiments. The auto-activate feature allows a DVD Multiple Player Device to easily identify the selected player by sending a specific navigate command to a DVD Player. The specific navigate command sent to the DVD Player is generally referred to as the Player Select command in this description. Since menu button 420 is the default button that is selected when the menu is entered, a Navigate Up command to the DVD Player causes the activation of the menu or audio/video sequence linked to menu button 430.

Figure 5:
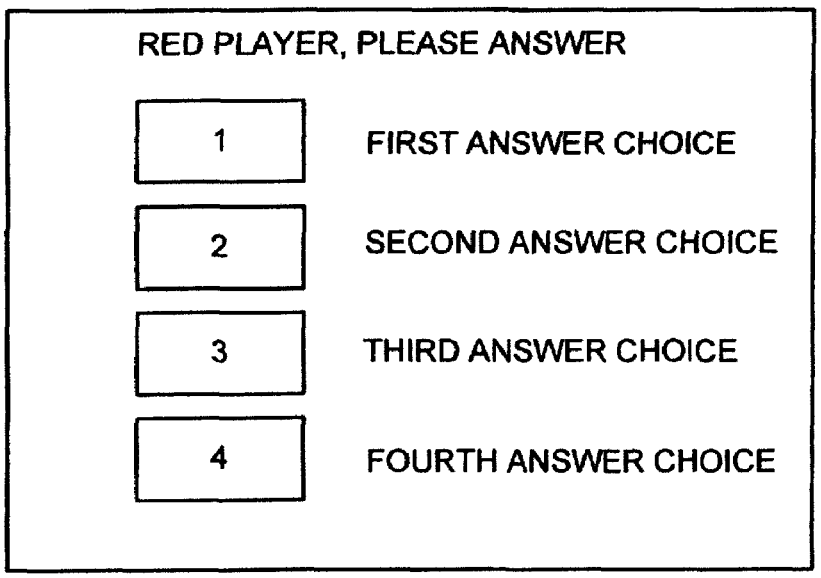
FIG. 5 illustrates an answer menu to a specific Game Challenge for the Red Player, according to embodiments.
Figure 6:
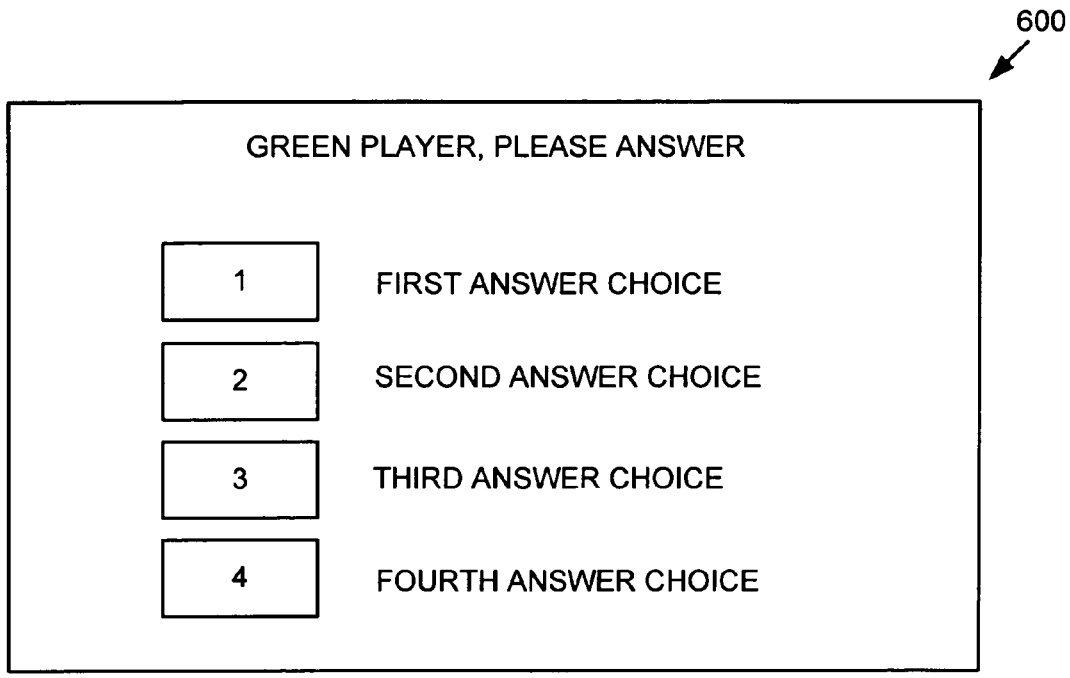
FIG. 6 illustrates an answer menu to a specific Game Challenge for the Green Player, according to embodiments.
Figure 7:
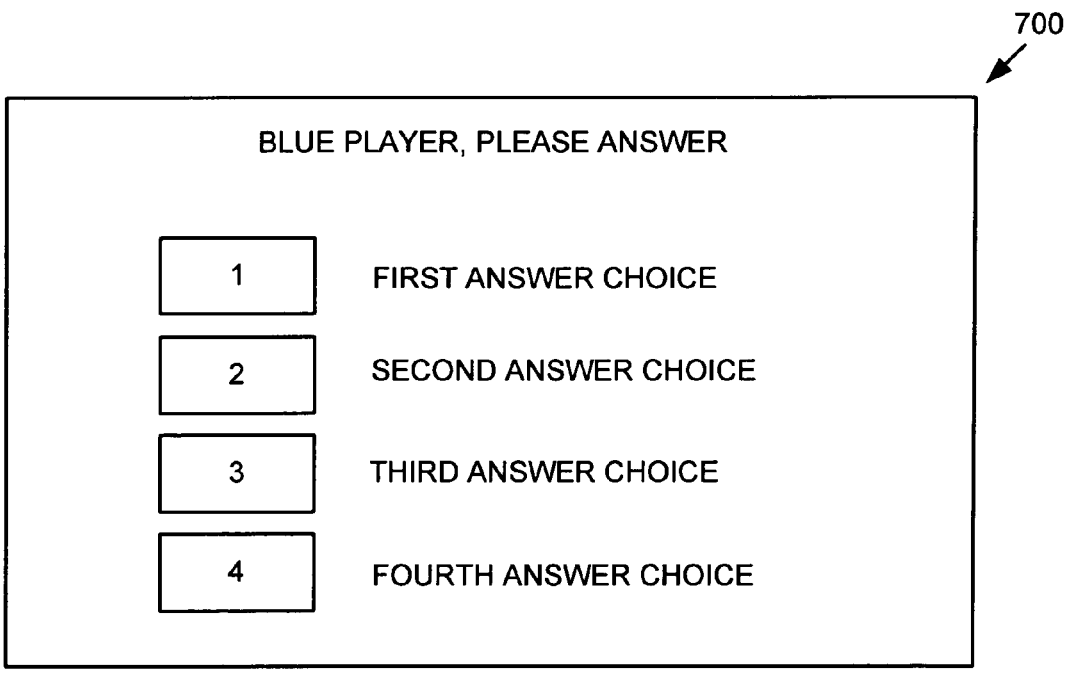
FIG. 7 illustrates an answer menu to a specific Game Challenge for the Blue Player, according to embodiments.
Figure 8:
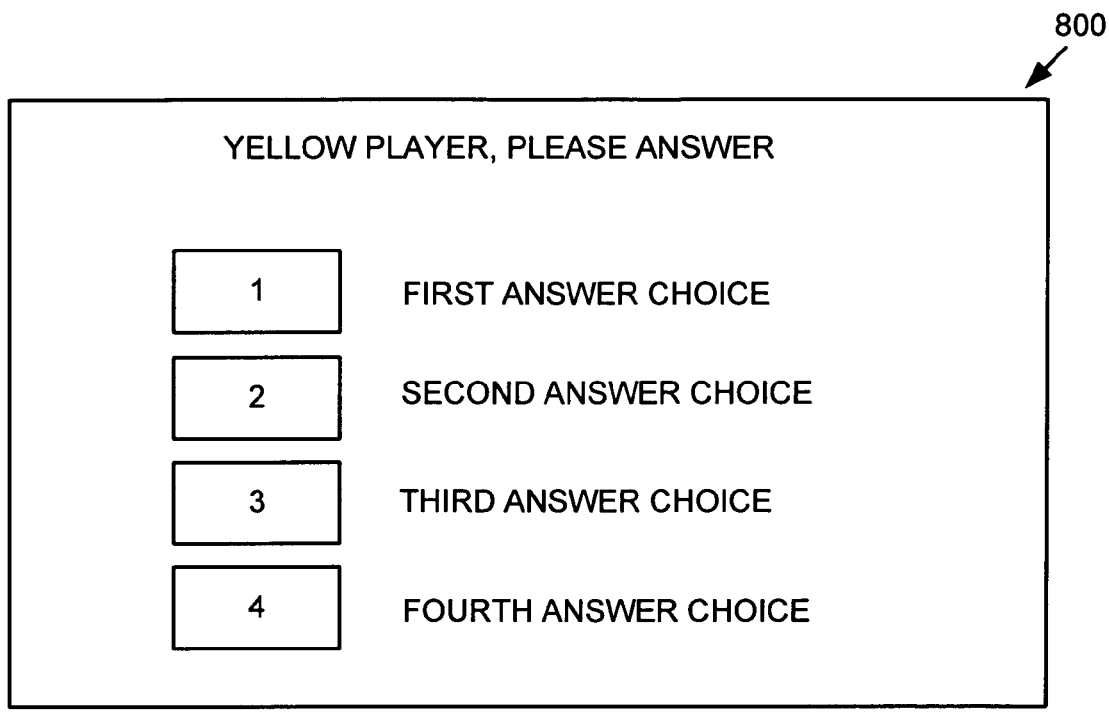
FIG. 8 illustrates an answer menu to a specific Game Challenge for the Yellow Player, according to embodiments.

In this example, menu button 430 is linked to the Red Player Answer Menu 500, shown in FIG. 5. A Navigate Right command to a DVD Player causes the activation of the menu or audio/video sequence linked to menu button 440. In this example, menu button 440 is linked to the Green Player Answer Menu 600, shown in FIG. 6. A Navigate Down command to a DVD Player causes the activation of the menu or audio/video sequence linked to menu button 450. In this example, menu button 450 is linked to the Blue Player Answer Menu 700, shown in FIG. 7. A Navigate Left command to a DVD Player will cause the activation of the menu or audio/video sequence linked to menu button 460. In this example, menu button 460 is linked to the Yellow Player Answer Menu 800, shown in FIG. 8. In this manner a DVD Multiple Player Device identifies the selected player by sending out a single type of Navigate command to the DVD Player. After a short delay, a DVD Multiple Player Device accepts Navigate Down commands from only the selected player's Player Remote Control and translates them to Navigate Down commands understood by the DVD Player, according to some embodiments. In this manner the selected player has the illusion of having direct control over the DVD Player, while the other players have no apparent control over the DVD Player whatsoever.

Figure 9:
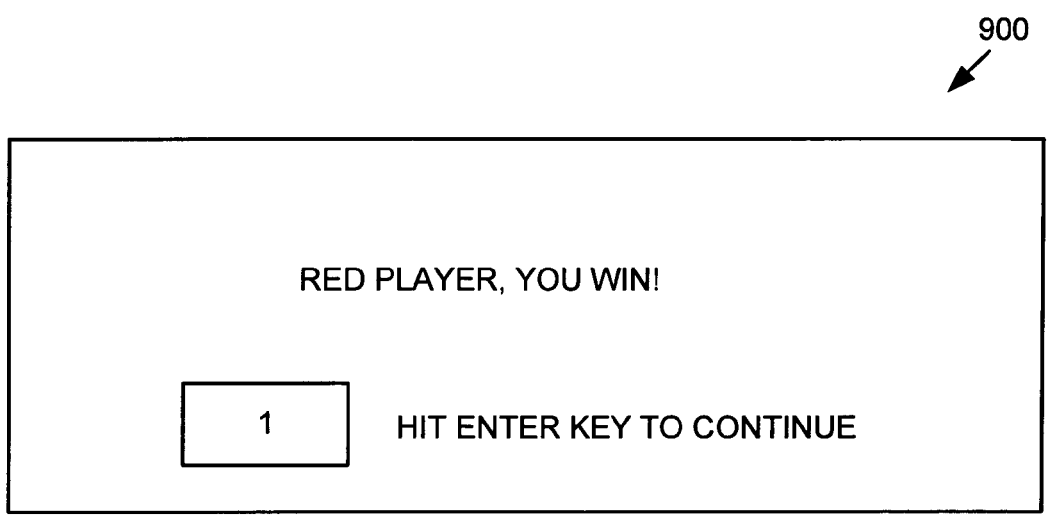
FIG. 9 illustrates an alternate type of answer menu to a specific Game Challenge for the Red Player, according to embodiments.

An alternate type of game play is shown in FIG. 9, where the act of chiming in is the answer itself. This type of game play is used to challenge the players to be the first one to identify a person or object as they are shown in succession, for example. In this example, menu button 430 is linked to the Red Player You Win Menu 900, shown in FIG. 9 on the menu with the correct person or object being displayed. The other buttons on the menu for the selection of the other players are linked to similar menus. All other menus showing the wrong persons or object would be linked to a menu or audio/video sequence showing that the person chimed in during the showing of the wrong person or object. This type of game play can be used for tie-breaking events, as an example.

Figure 10:
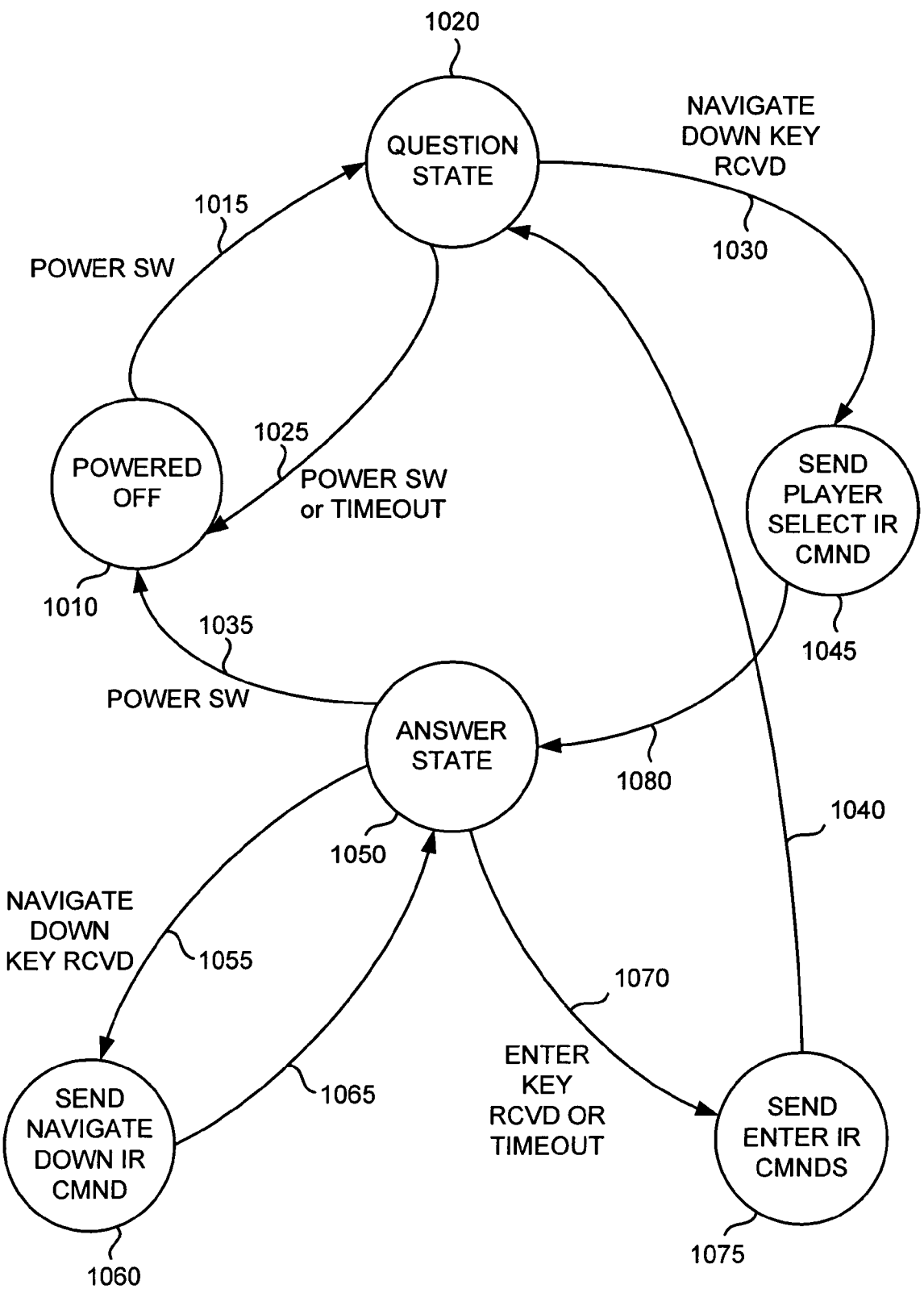
FIG. 10 illustrates a State Transition Diagram for the DVD Multiple Player Device unit, according to embodiments.

FIG. 10 illustrates a state diagram giving a more detailed description of the operation of a DVD Multiple Player Device such as the DVD Multiple Player Device 140 shown in FIG. 1. In some embodiments, when the device is not being used it remains in a Powered Off state 1010, consuming very little power. In other words, the DVD Multiple Player Device has powered down all components that are not needed.

The user powers on the device by pressing a Power Switch. As a result, the DVD Multiple Player Device transitions to a Question State 1020 via arc 1015. This is the normal "at rest" state while the game is being played. Note that the device returns to the Powered Off state 1010 when the user presses the Power SW again or if the device times out via arc 1025. For example, the DVD Multiple Player Device times out after 6 minutes of inactivity. Other time periods may be used.

When a DVD Multiple Player Device detects a ring in, the device sends a Player Select command 1045 via arc 1030 to the DVD Player and transitions to the Answer State 1050 via arc 1080. The specific command sent to the DVD Player depends on which player rang in first, as previously described.

While in the Answer State 1050, a DVD Multiple Player Device watches for a command, such as a Navigate Down key or an Enter key, from the selected player and ignores any signals from any of the other player's remote controls. If a Navigate Down command from the selected player is detected, the DVD Multiple Player Device sends a Navigate Down command 1060 understood by a DVD Player to the DVD Player via arc 1055 and transitions back to the Answer State 1050 via arc 1065, effectively giving the selected player control over the DVD Player.

The DVD Multiple Player Device waits until its receiver has been quiet for a short period of time, e.g., 100 milliseconds, before sending the commands to the DVD Player. This "wait for a dark period" action increases the likelihood that the DVD Player receives a clean IR command with minimum interference from the transmissions of other players' remote controls. In some embodiments, the "wait for a dark period" is not necessary.

In the above example, when an Enter key from the selected player is detected, the DVD Multiple Player Device sends Enter commands understood by the DVD Player to the DVD Player, effectively selecting the highlighted menu item in the DVD Player. Different DVD players may use different commands to select a highlighted menu item. Some will use Play, some will use Select and others may use Enter. In this description, Enter is used to indicate the command that has the affect of selecting the highlighted menu item in the DVD Player being used.

Again, the DVD Multiple Player Device waits until its receiver has been quiet for a short period of time, e.g., 100 milliseconds, before sending two separate Enter commands to the DVD Player. This "wait for a dark period" and "send multiple commands" actions increase the possibility that the DVD Player will always receive a complete command with minimum interference from the transmissions of Player Remote Controls. In some embodiments, the wait for a dark period is longer. In other embodiments, it is shorter. Similarly, the commands may be sent once or multiple times.

Eventually, a DVD Multiple Player Device transitions out of the Answer State 1050 through the arc 1070 after detecting an Enter key from the selected player or from a timeout condition. The timeout condition is a period of time in which the Enter key has not been detected. In some embodiments, the timeout period is 30 seconds. In other words, if the selected player has not made a selection on the menu within 30 seconds, the DVD Multiple Player Device makes a selection for him or her. Obviously, other time periods may work as well or better for any particular game play.

After the DVD Multiple Player Device sends the Enter commands 1075, it transitions back to the Question State 1020 via arc 1040. The DVD Multiple Player Device is now ready to accept another "ring in" request from players.

During game play there is a possibility that two or more players will try to chime in at the same time. As mentioned, the Player Remote Controls implement a tie-breaking technique that increases the probability that one of the players is recognized as the first player to ring in.

Figure 11:
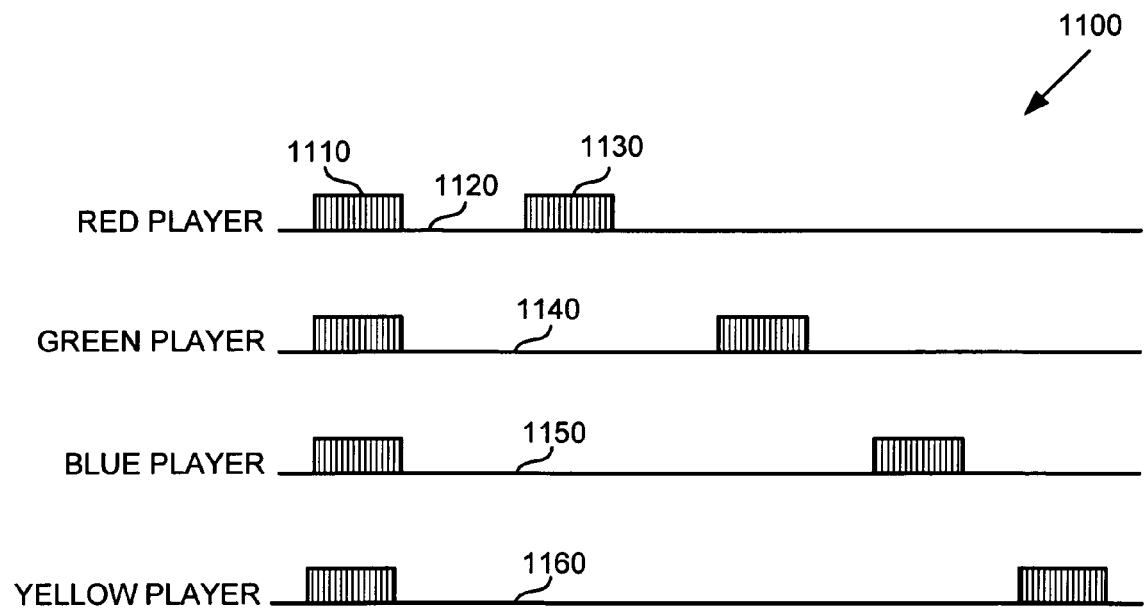
FIG. 11 illustrates the Relative Timing Diagram for the tie-breaking method of the Player Remote Control units, according to embodiments.

FIG. 11 shows the relative timing relationship 1100 between the transmissions of signals for different Player Remote Controls. For example, the transmissions are IR signals. The transmission time of a code signal is referred to as the Code Transmission Time (CTT), shown as pattern 1110 in FIG. 11. This is the time it takes to send a code signal when a key is pressed on a Player Remote Control.

In some embodiments, a second code transmission is sent to ensure receipt of the signal. A pause between the first code and the second code is referred to as the Code Space Time (CST). For the Red player a first transmitted code is followed by a CST 1120 of approximately CTT+10%. The additional 10% of spacing guarantees that the CTT 1110 and the CTT 1130 do not overlap one of the other Player Remote Control's CTT. If there is interference by another second Player Remote Control's CTT with the first CTT of the first Player Remote Control's CTT, then the second CTT of one of the Player Remote Control's will go through without interference. In some embodiments, the pause between transmissions is more or less than the exemplary CTT+10%.

The CST of each successive Player Remote Control is long enough to guarantee that both CTT bursts do not interfere with by the preceding Player Remote Control's CTT bursts. For example, the Green player's CST 1140 is 110% of the total of the Red player's CTT, CST and second CTT, the Blue player's CST 1150 is 110% of the total of the Green player's CTT, CST and second CTT, the Yellow player's CST 1160 is 110% of the total of the Green player's CTT, CST and second CTT. Alternatively, other combinations or percentages may be used.

Figure 12:
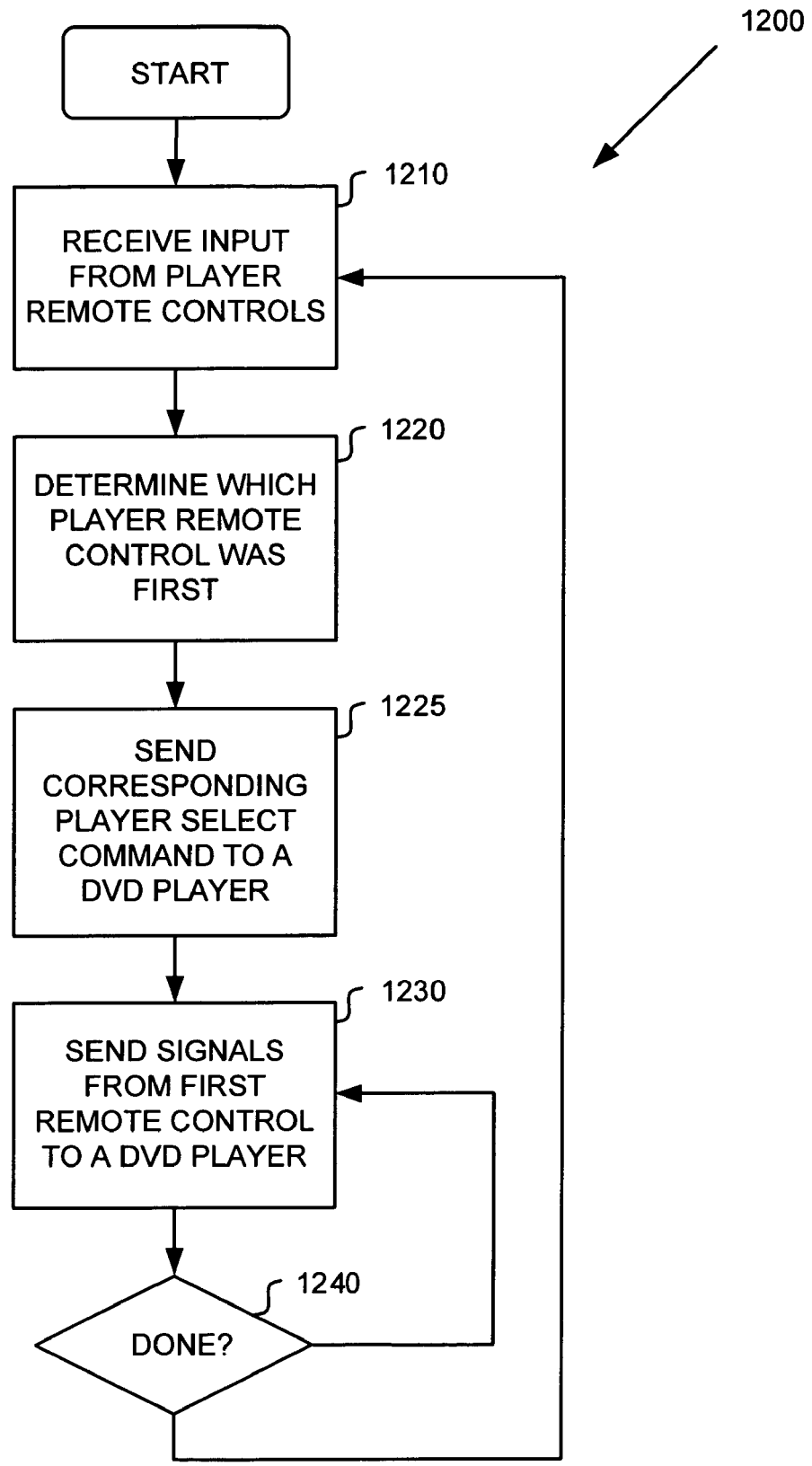
FIG. 12 illustrates a flowchart illustrating a technique for playing a multi-player game using standard consumer electronics equipment.

FIG. 12 illustrates a technique 1200 for playing a multi-player game using standard consumer electronics equipment. A part of playing a multi-player game using standard consumer electronics equipment generally includes receiving input from remote controls 1210, determining which of several remote controls sent the first signal 1220, identifying the first player and sending signals from the first remote control to the standard consumer electronics equipment 1230. In some embodiments, a system such as system 100 illustrated in FIG. 1 performs the technique 1200. Alternatively, another system performs the technique 1200.

In a first stage 1210, suppose game play is initiated on standard consumer electronics devices, such as the DVD Player 110 and the Television 120 described in connection with FIG. 1, and eventually reaches a point where a question or challenge has been presented to multiple players. At least one player indicates their desire to answer the challenge by pressing the appropriate input key on their remote control. In some embodiments, the remote control is the Player Remote Control 300 shown in FIG. 3. The signals transmitted from the player remote controls are received by a device such as the DVD Multiple Player Device 200 described in connection with FIG. 2.

In a second stage 1220, a receiving device determines by analyzing signal codes and arrival time, which player signaled first. Suppose red player is the first player to hit the input key on their remote control during the presentation of a Game Challenge, e.g., before the time to respond is allowed to expire. The receiving device analyzes the received signals using techniques such as those described in connection with FIG. 12 and indicates which player rang in first. In some embodiments, the immediate indication of who the first player was to respond to the Game Challenge is an LED, a text message, an audio alert, etc. In some embodiments, once the determination has been made, the receiving device blocks out signals coming from other players' remote controls.

In a third stage 1225, the Player Select command is sent to the DVD player 110 described in connection with FIG. 1. The Player Select command causes a transition from the Game Challenge menu 400, to the selected player's Player Answer Menu 500, 600, 700, 800 or 900, described in connection with FIGS. 4, 5, 6, 7, 8, and 9.

In a fourth stage 1230, commands received from the selected player's remote control are translated into commands that are understood by the standard consumer electronics equipment. For example, if the selected player hits the Navigate-Down key on their remote, the receiving device, e.g., the DVD Multiple Player Device, translates the command into a Navigate-Down command that is understood by the consumer electronics. The translated commands cause changes to occur on the consumer electronics display. For example, a Navigate-Down command causes the button selection to change on the Answer Menu, such as the Red Player Answer Menu 510 described in connection with FIG. 5. Each time the selected player presses the Navigate-Down key on their remote control, the menu shifts or a different button is highlighted. In this manner the player controls the consumer electronics equipment to highlight the menu item of their choice, which, in the case of a Game Challenge, presumably is the choice believed to be the correct answer.

In a final stage 1240, a check is performed to see if any additional input is sent by the selected player. For example, when a menu item is highlighted on the consumer electronics display, the player presses the Enter key on the player's remote. The receiving DVD Multiple Player Device translates the command into an Enter command that is understood by the consumer electronics equipment, thereby selecting the highlighted menu item. The resulting actions vary according to the authoring of the game and the selection of the menu item. For example, if the menu item selected was the right answer it will invoke a certain response. If the menu item selected was the wrong answer it will invoke a different response. In some embodiments, the game is authored to allow the consumer electronics device to keep score and otherwise alter the game play based on the player selections.

Receiving the Enter key indicates that input is complete, i.e. the question has been answered, and the technique is restarted. For example, after the selected player answers a question, the game advances play to the next Game Challenge, invoking another input key response from the one or more players. In this manner, game play continues until the game is over as determined by the authoring of the game.

Alternatively, various stages of the technique 1200 are separately or in various combinations performed in conjunction with other stages.

Now that the devices and menu hierarchy examples of the invention have been described, the reader should be able to imagine different game modes or different game plays.

In view of the wide variety of permutations to the embodiments described herein, this detailed description is intended to be illustrative only, and should not be taken as limiting the scope of the invention. To illustrate, while operations have been described with reference to a DVD Multiple Player Device, embodiments are not so limited. For example, in an embodiment, the functionality of a DVD Multiple Player Device can be embodied in the DVD Player. Moreover, while described with reference to the playing of games, embodiments are not so limited. For example, in one embodiment, the DVD Disc can be authored as training or learning device. Therefore, the specification and drawings are to be regarded in an illustrative rather than a restrictive sense.

I claim:

1. A game-playing apparatus, comprising:
  a DVD authored for providing an interactive game;
  a DVD player for playing said DVD;
  a first handset and a second handset for remotely controlling operation of said DVD player for playing the interactive game, said first handset and said second handset each having at least one corresponding control button;
  means for having a first control signal transmitted to said DVD player when said at least one corresponding control button of said first handset is operated for navigating between on-screen menu buttons; and, means for having a second control signal transmitted to said DVD player when said at least one corresponding control button of said second handset is operated for navigating between on-screen menu buttons, said second control signal being different from said first control signal, said DVD being further authored for presenting an on-screen menu for distinguishing between said first control signal and said second control signal, said on-screen menu comprising a first on-screen menu button having a first action associated therewith, which is automatically invoked in response to the transmission of said first control signal, and a second on-screen menu button having a second action associated therewith, which is automatically invoked in response to the transmission of said second control signal, the first action associated with said first on-screen menu button being different from the second action associated with said second on-screen menu button.

2. The game-playing apparatus according to claim 1, wherein said first control signal transmitted to said DVD player within a predetermined period of time determines which player is subsequently provided with the opportunity to respond to a game challenge.

3. The game-playing apparatus according to claim 1, wherein each said control signal transmitted to said DVD player within a predetermined period of time comprises a response to a game challenge.

4. The game-playing apparatus according to claim 1, further comprising an electronic control mechanism responsive to said at least one corresponding control button of each of said first handset and said second handset being operated for transmitting said control signals to said DVD player.

5. The game-playing apparatus according to claim 1, wherein each said control signal comprises at least one menu-navigation command selected from "navigate-UP," "navigate-DOWN," "navigate-LEFT" and "navigate RIGHT" followed by an "ENTER" command for activating a respective menu-button.

6. The game-playing apparatus according to claim 1, wherein each said control signal comprises at least one menu-navigation command selected from "navigate-UP," "navigate-DOWN," "navigate-LEFT" and "navigate RIGHT," said DVD being further authored for allowing a respective menu button associated with each said control signal to be automatically activated upon being highlighted, thereby obviating any requirement for transmitting an "ENTER" command.

7. The game-playing apparatus according to claim 4, wherein said electronic control mechanism includes:
  means for identifying a first control button of said first handset or said second handset to be operated; and,
  means for transmitting said control signal associated with said first control button to be operated to said DVD player.

8. A method for configuring an apparatus for use in playing an interactive game, comprising the steps of:
  providing DVD authored for providing an on-screen menu within an inter-active game for distinguishing between a first control signal for navigating between a first on-screen menu button and a second control signal for navigating between a second on-screen menu button, said second control signal being different from said first control signal, said first on-screen menu button having a first action associated therewith, which is automatically invoked in response to the transmission of said first control signal, and a second on-screen menu button having a second action associated therewith, which is automatically invoked in response to the transmission of said second control signal, the first action associated with said first on-screen menu button being different from the second action associated with said second on-screen menu button;
  providing a DVD player for playing the DVD;
  providing a first handset and a second handset for remotely controlling operation of the DVD player to play the interactive game; and,
  configuring the apparatus for playing an interactive game so that the first control signal is transmitted to the DVD player when a control button of the first handset is operated and the second control signal is transmitted to the DVD player when a corresponding control button of the second handset is operated.

9. The method for configuring an apparatus for use in playing an interactive game according to claim 8, wherein the first control signal transmitted to the DVD player within a predetermined period of time determines which player is subsequently provided with the opportunity to respond to a game challenge.

10. The method for configuring an apparatus for use in playing an interactive game according to claim 8, wherein each said control signal transmitted to the DVD player within a predetermined period of time comprises a response to a game challenge.

11. The method for configuring an apparatus for use in playing an interactive game according to claim 8, further comprising the step of:
  providing an electronic control mechanism responsive to a control button of each of the first handset and the second handset being operated for transmitting the control signals to the DVD player.

12. The method for configuring an apparatus for use in playing an interactive game according to claim 8, wherein each said control signal comprises at least one menu-navigation command selected from "navigate-UP," "navigate-DOWN," "navigate-LEFT" and "navigate RIGHT," the DVD being authored for allowing a respective menu button associated with each said control signal to be automatically activated upon being highlighted, thereby obviating any requirement for transmitting an "ENTER" command.

13. The method for configuring an apparatus for use in playing an interactive game according to claim 11, further comprising the steps of:
  identifying via the electronic control mechanism a first control button of the first handset or the second handset to be operated; and,
  transmitting via the electronic control mechanism the control signal associated with the first control button to be operated to the DVD player.

14. The method for configuring an apparatus for use in playing an interactive game according to claim 8, wherein each said control signal comprises at least one menu-navigation command selected from "navigate-UP," "navigate-DOWN," "navigate-LEFT" and "navigate RIGHT" followed by an "ENTER" command for activating a respective menu-button.

* * * * *